(12) United States Patent
Sinha

(10) Patent No.: US 9,258,046 B2
(45) Date of Patent: Feb. 9, 2016

(54) EFFICIENT BEACON TRANSMISSION AND RECEPTION

(71) Applicant: Broadcom Corporation, Irvine, CA (US)

(72) Inventor: Rajesh Kumar Sinha, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 101 days.

(21) Appl. No.: 14/070,860

(22) Filed: Nov. 4, 2013

(65) Prior Publication Data

US 2015/0103756 A1 Apr. 16, 2015

Related U.S. Application Data

(60) Provisional application No. 61/890,520, filed on Oct. 14, 2013.

(51) Int. Cl.
*H04W 16/28* (2009.01)
*H04B 7/04* (2006.01)
*H04W 52/02* (2009.01)

(52) U.S. Cl.
CPC .......... *H04B 7/0491* (2013.01); *H04W 52/0216* (2013.01); *H04W 16/28* (2013.01)

(58) Field of Classification Search
None
See application file for complete search history.

(56) References Cited

U.S. PATENT DOCUMENTS

| 2006/0217076 A1* | 9/2006 | Bishop | 455/73 |
| 2010/0142460 A1* | 6/2010 | Zhai et al. | 370/329 |
| 2011/0013611 A1* | 1/2011 | Chou et al. | 370/338 |

* cited by examiner

*Primary Examiner* — Chi H Pham
*Assistant Examiner* — Shick Hom
(74) *Attorney, Agent, or Firm* — Brinks Gilson & Lione

(57) ABSTRACT

A control point, such as a laptop, phone, wireless access point, or other device, transmits beacons to receiving stations in a wireless network. The control point may reduce power and bandwidth consumption by transmitting beacons with smaller payloads and/or less frequently to sectors with no associated stations. The stations, which may include laptops, phones, or other devices may reduce power consumption be powering on their antennas when beacons may be transmitted to their sectors.

20 Claims, 18 Drawing Sheets

US 9,258,046 B2

EFFICIENT BEACON TRANSMISSION AND RECEPTION

PRIORITY CLAIM

This application claims priority to U.S. Provisional Application Ser. No. 61/890,520, filed Oct. 14, 2013, which is incorporated herein by reference in its entirety.

BACKGROUND

1. Technical Field

This disclosure relates to beaconing in wireless communication protocols.

2. Related Art

Today, a spectrum of electronic devices that incorporate wireless communication technologies is available. For example, cell phones, tablets, global positioning system (GPS) devices, and laptop computers are in wide use. Further, wireless protocols deliver an increasing range of service. For example, streaming music and High Definition (HD) video have seen increased adoption. Demand for such electronic devices may be driven by their ability to provide the bandwidth used in the delivery of these services. Devices that efficiently use wireless spectrum to provide high throughput may experience increased demand.

DETAILED DESCRIPTION

The disclosure below concerns techniques for efficient beacon transmission and reception. A wide variety of different wireless electronic devices may implement these techniques. Accordingly, the wireless communication environment example described below provides an example context for explaining the beaconing techniques. In other words, the environment is just one example of a wide array of environments and devices that may incorporate the beaconing techniques.

Figure 1:
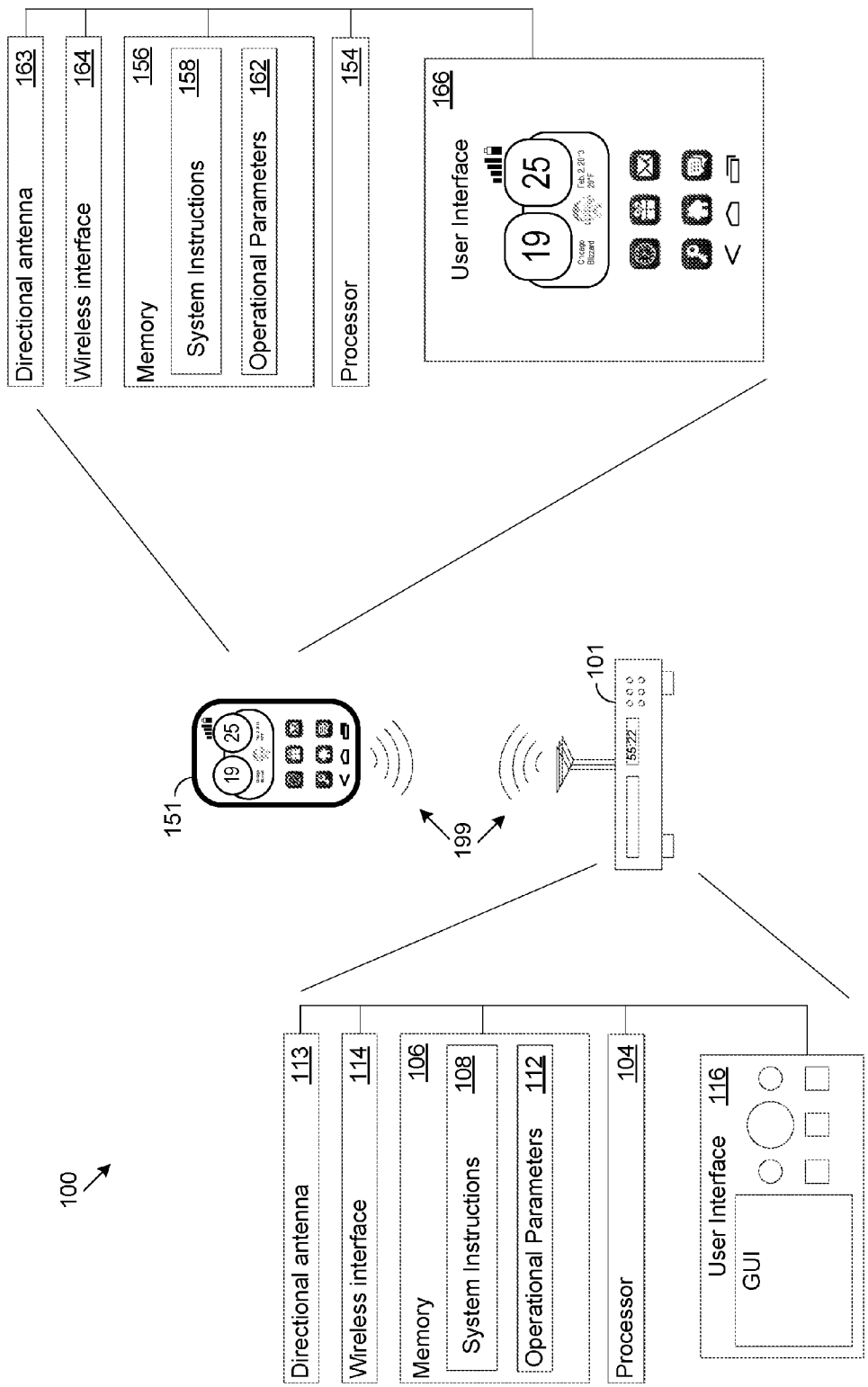
FIG. 1 shows an example wireless communications environment.

FIG. 1 shows an example wireless communications environment 100. In one example, multiple devices 101, 151 may communicate over a wireless protocol. The devices may be virtually any wireless enabled device. For example, laptops, tablets, cellular telephones, access points, network controllers, audio/visual equipment, data storage device, portable gaming systems, and/or other wireless enabled devices.

The station (STA) 101 may include one or more processors 104 to support execution of applications and general operation of the STA. The STA 101 may include memory 106 for execution support and storage of system instructions 108 and operation parameters 112. The STA 101 may also include one or more wireless interfaces 114 to support over-the-air communications. The wireless interfaces 114 may be operatively connected to a directional antenna 113. The wireless interfaces may include baseband processors, signal processing hardware, and other signal components to support communications by the STA 101 over one or more wireless protocols. The wireless interfaces may support protocols such as wireless local area network (WLAN) (IEEE 802.11ad and or other WLAN protocols), cellular data/voice (LTE/LTE-A, 4G, 3G/2G, and/or other cellular protocols), Bluetooth, WiMAX, or other wireless protocols. The directional antenna may include multiple antennas for varied protocols. Multiple antennas of the directional antenna may be used for directed transmission/reception and/or transmitting/receiving signals with varying spatial modes. In various implementations, directed transmission/reception may be achieved via phased-array beam steering. In some implementations, various functions of the directional antenna 113 may be performed by a single antenna, which may be directed or omnidirectional. The STA 101 may include a user interface 116 to allow for user operation of the STA.

The STA 101 may be in communication with a second STA 151 via the STAs' wireless interfaces 114 and 164, respectively. The STA 151 may also include one or more processors 154 and memory 156 for execution support and storage of system instructions 158 and operation parameters 162. The STA 151 may also include a directional antenna 163, which may include one or more antennas.

The STAs 101, 151 may communicate over a common wireless protocol 199 which may be dependent on beaconing for communication link maintenance. In various implementations, the STAs 101, 151 may communicate in an ad hoc network arrangement. Alternatively or additionally, one of the STAs may act as a coordination device or control point (CP) for a group of STAs (including STAs 101, 151) in an ad hoc arrangement. In some cases one of STAs 101 and 151 may act as an infrastructure element, such as an access point, router, network controller, or other infrastructure element. Additionally or alternatively, STAs 101 and 151 may communicate via a third STA acting as an infrastructure element.

In some cases, wireless protocol 199 may be a high throughput. For example, the 802.11ad standard may offer throughput of up to 7 Gbps or more in wireless data transmissions.

In some implementations, the wireless protocol 199 may be a network using a personal basic service set (PBSS). For example, an IEEE 802.11ad network. In some cases, the STAs in the network may communicate directly with one another. In some PBSS networks one STA assumes may the role of the CP. The CP may provide the basic timing a PBSS network through a beacon frame. Allocation of service periods and contention-based access periods may also occur in the beacon frame. Additionally or alternatively, some of the functionality of the beacon frame may be accomplished in an announce frame.

In some cases, to act as a CP a STA may include determined functionalities. For example, a CP may have directional multi-gigabit (DMG) communication capabilities.

In some implementations, multiple STAs within a PBSS network may be capable of operating as a CP. The role of CP may be passed among STAs capable of operation as a CP. The CP services (CPS) may be provided by the STA which is currently acting as the CP. In some implementations, Non-CP STAs may not provide CPS. CPS may include services such as, beacons, association instructions, disassociation instructions, reassociation instructions, quality of service (QoS) traffic scheduling, and/or other services.

Figure 2:
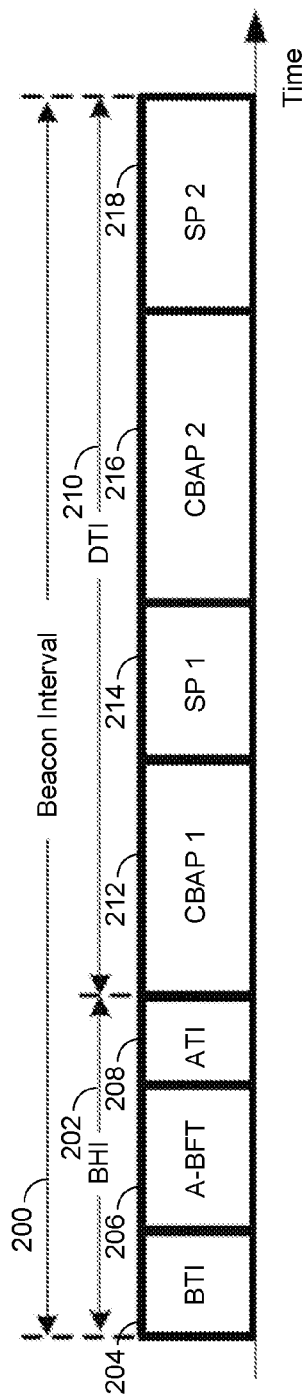
FIG. 2 shows an example beacon transmission interval.

Timing in the wireless protocol 199 may be divided into beacon intervals. FIG. 2 shows an example beacon transmission interval 200. The beacon interval may be subdivided into a beacon header interval (BHI) 202 and a data transmission interval (DTI) 210. Beaconing and network management tasks may be performed during the BHI. Data payload transfer and management tasks may be performed during the DTI. Additionally or alternatively, data payload transfers may occur during the BHI. The BHI 202 and DTI 210 may be divided into access periods. Different access periods within an interval may have different access rules. The parameters of the access periods may be detailed in a schedule that is communicated by beacons from the CP to the non-CP STAs within the network. In various implementations, the BHI may be divided into access periods including the BTI 204, the association beam forming training access period (A-BFT) 206, the announcement transmission interval (ATI) 208 and/or other access periods. The DTI may be divided into access periods including contention based access periods (CBAPs) 212, 218, scheduled service periods (SPs) 214, 216, and/or other access periods.

During the BTI 204, beacon frames, such as DMG beacon frames, may be transmitted. Beacon frames may be detectable by non-CP STAs. In some cases, beacon frames may include low bit-rate data. For example, low bit-rate data may be supported by legacy STAs and/or STAs that do not support multi-gigabit data. In some cases, non-CP STAs in the network may not transmit during the BTI 204.

During the A-BFT 206 beamforming training may be performed. In some cases, training may be performed with the CP which transmitted beacons during the BTI. In various implementations non-CP STAs may perform beamforming training directly with other non-CP STAs. In some cases, the CP may determine to include or not to include the A-BFT in the BHI. The CP may signal the presence of the A-BFT in beacons during the BTI. Additionally or alternatively, the timing of the A-BFT may be defined in the beacons transmitted during the BTI. In various implementations, the CP may determine to include or to not include individual STAs for participation in the A-BFT. Participation may be signaled in the BTI.

During the ATI 208, the CP may engage in a request-response based management access period between CP and non-CP STAs. In some cases, the CP may determine to include or not to include the A-BFT in the BHI. The CP may signal the presence of the ATI in beacons during the BTI. Additionally or alternatively, the timing of the ATI may be defined in the beacons transmitted during the BTI. In various implementations, the CP may determine to include or to not include individual STAs for participation in the ATI. Participation may be signaled in the BTI.

The DTI may include a number of CBAPs. In the example DTI 210, two CBAPs 212, 218 are included. During a CBAP, STAs may gain access to the communication medium, e.g. spectrum at 60 GHz, 2.4 GHz, a directed communication path or other medium via a contention based access scheme. In a contention based access scheme, access to transmission resources may be unscheduled. For example, a STA with an impending transmission may request other STAs to be silent during for a period. The period may be requested by the STA, or may be determined by other factors. For example, the length of the silence by the other STA may be dependent on the quantity of data the transmitting STA sends, the time that the transmitting STA uses the transmission medium, requests made by other STSs to transmit, a maximum time/data amount that may be reserved with a request, and/or factors.

During the SPs 214, 216, the CP may schedule access to the communication medium for the non-CP STSs. For example, the STSs may make requests for transmission resources, such as a transmission window on a directed communication pathway, from the CP. The CP may provide a resource grant in response.

In some implementations, a STA, such as an STA with DMG functionality, may access a communications channel during a beacon interval. The access may be CP-coordinated using a schedule. The CP may generate the schedule and communicate the schedule to STSs during the BTI and/or ATI. Non-CP STSs that receive the scheduling information may access the medium during the scheduled periods using the access rules defined in the schedule.

In various implementations, the CP may control the timing within the network. In some cases, timing indicators in the form of timing synchronization function (TSF) for timing synchronization may be provided by the CP, e.g. in a PBSS network. The CP may transmit a beacon, e.g. a DMG beacon, that contains a TSF timer value. Other STSs in the network may synchronize their TSF times to the CP timer value from the beacon. In various implementations the CP may transmit the beacon during the BTI. A receiving non-CP STA may accept the timing information from an associated CP. In some cases a non-CP STA may have a timer value for the TSF that does not match the timestamp a beacon received from the CP. The non-CP STA may change its own timer value to match the timestamp received in the beacon from the CP.

Additionally or alternatively, the beacon transmitted by the CP may include other parameters for the wireless protocol 199. The beacon may contain one or more information elements (IEs) that may be used by a STA to join the wireless network controlled by the CP. For example, a DMG CP Capability IE may be included and may be used by new STA during a network join operation. Additionally or alternatively, the beacon may include other IEs, such as, DMG STA Capability IEs for advertising information about associated STAs in the wireless network, Extended Schedule IEs to schedule traffic streams, Wakeup Schedule IEs to schedule power saving processes, Awake Window IEs to schedule announcement traffic indication message (ATIM) frames, STA Availability IEs which may contain lists of STAs in the network which may be available in the subsequent access periods, and/or other IEs.

Figure 3:
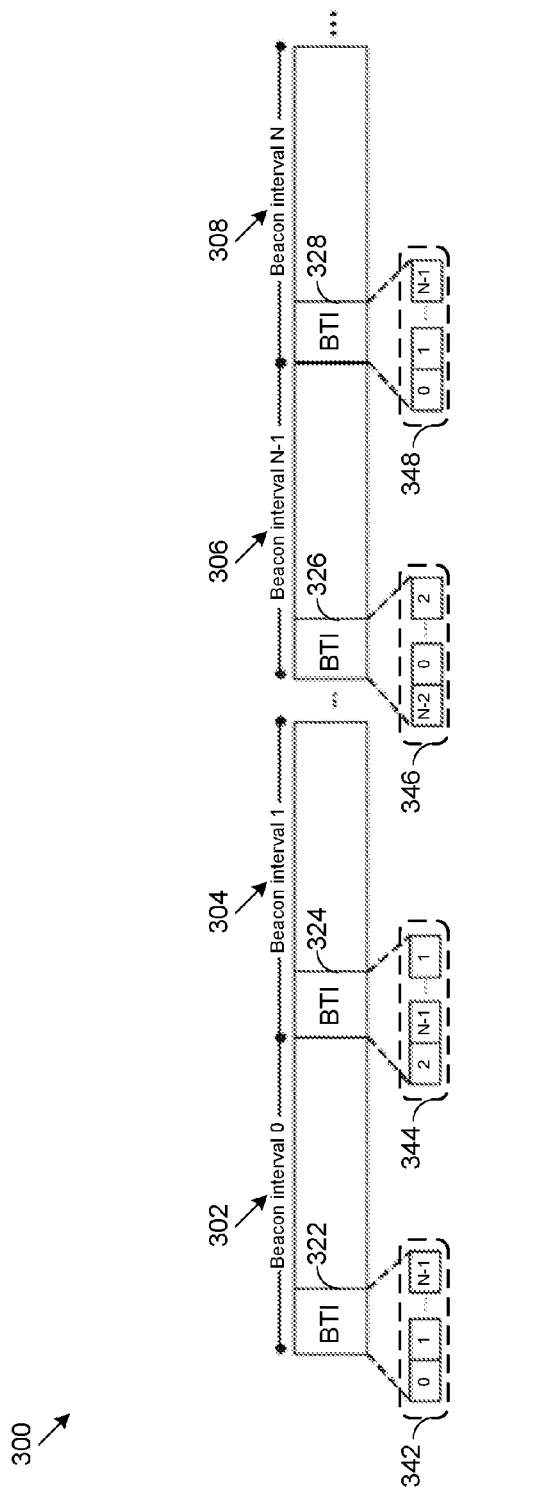
FIG. 3 shows an example pseudo-randomized directional beacon transmission process.

The CP may transmit beacons for different configuration of its directional antenna. For example, DMG beacon transmission may be performed using multiple directional transmissions, and a beacon may be sent in different ones of the directions. A CP may change the sequence of directions through which beacons are transmitted. For example, after the CP has transmitted a DMG beacon frame through the directions in the current sequence of directions, the CP may implement a new sequence for a subsequent round of beacon transmissions. In various implementations the CP may implement random, pseudo-random, and/or deterministic DMG beacon transmission sequence changes. In some cases, the random sequencing of the DMG beacon may randomize interference to/from the beaconing process. FIG. 3 shows an example pseudo-randomized directional beacon transmission process 300. During the BTIs 322, 324, 326, 328 within the beacon intervals 302, 304, 306, 308, the directional beacons are transmitted in a sequence 342, 344, 346, 348. In the example of FIG. 3, the sequences 342, 344, 346, 348 may be pseudo-randomly selected from a listing of possible sequences for the transmitting CP.

In some cases, a STA acting as a CP may be a battery powered portable device, for example, laptop, mobile phone, PDA device, or other portable device. Reducing the power consumption of the CP may contribute to increased commercial success of the CP device.

Figure 4:
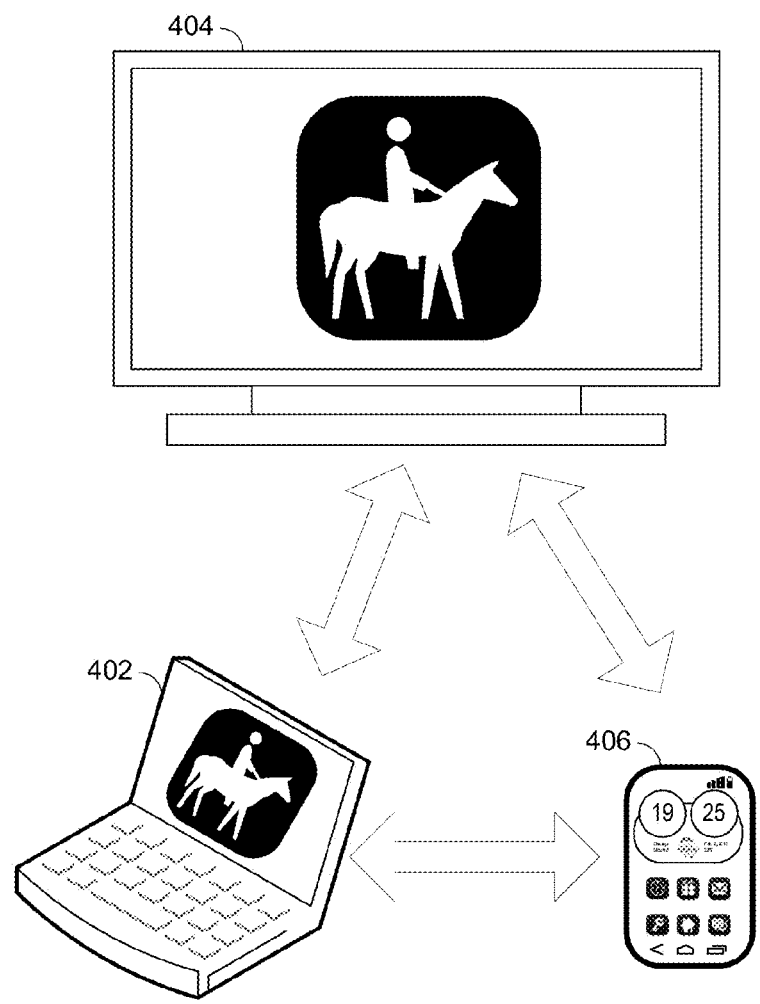
FIG. 4 shows an example network with a control point (CP) and multiple non-CP stations (STAs).

FIG. 4 shows an example network with a CP 402 and multiple non-CP STAs 404, 406. In the example, the CP 402 may be a laptop computer. The non-CP STAs 404, 406 may be a video monitor and a cellular phone. The non-CP STAs may engage in directional communications directly. In some cases, the CP 402 may coordinate the wireless protocol among the STAs, and the STAs may not use the CP as an intermediary in direct communications. In some implementations, the CP may act as an intermediary for STAs engaged in indirect communications.

In some cases, it may be advantageous to maximize transmission resources used for data transmission and to minimize resources used in network management while maintaining network robustness and reliability. Beacon transmission may be a regular and/or frequent activity for a CP e.g. recurring with beacon intervals. It may be advantageous to minimize the resources used in beacon transmission to reduce power consumption by the CP and to increase resources available for data transmission.

In some implementations, a beacon may be used as a beamforming (BF) training frame. For example, in the IEEE 802.11ad standard, a DMG beacon may be used in the BF training process. The BF process may begin with a sector level sweep (SLS) from the initiator. A directional beacon transmission may be used as an SLS where the CP is the initiator. Non-CP STAs may perform SLSs outside of the CP beacon process. Non-CP STA SLSs may enable direct communications between STAs that do not use the CP as an intermediary. A beam refinement protocol (BRP) may follow the SLS, for example, if requested by either the initiator or the responder. The SLS phase may enable communications between the two participating STAs at the control PHY rate or via a high throughput modulation and coding scheme (MCS). The control PHY rate may be associated with low throughput. The control PHY rate may be supported by the devices in the network. For example, legacy or low capability devices may support the control PHY rate and not support one or more high throughput MCSs. In some implementations, the SLS phase provides transmit BF training. The BRP phase may enable receiver training and iterative refinement of the antenna weight vectors (AWV) of the transmitters and receivers of the participating STAs. In some cases, the total number of sectors for a directional antenna may range from 1 to 128 sectors. In some implementations the number of sectors may vary over an extended range.

Figure 5:
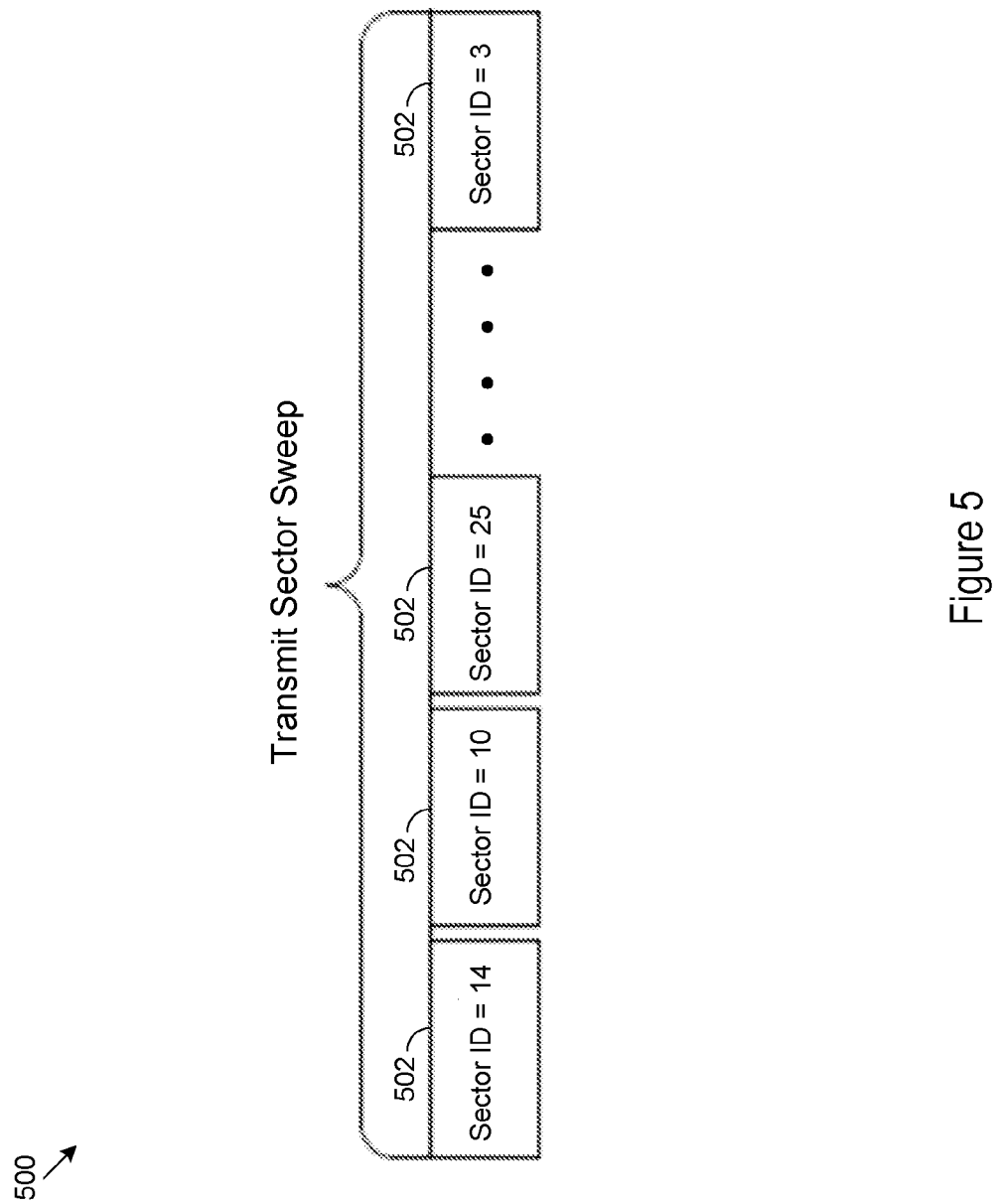
FIG. 5 shows an example transmit sector sweep.

A directional antenna may include a phased array, a single element antenna, a set of switched beam antennas covered by a quasi-omnidirectional antenna pattern, or other directional antenna structure. A transmit sector sweep (TXSS) may be performed during beacon transmission. A TXSS may rotate beacon transmission through antenna sectors in pseudo-random order in BTI during one or multiple beacon intervals. Additionally or alternatively, a random rotation through beacon transmission sectors may be used. In some implementations, The TXSS can contain 128 sectors per directional antenna. In some cases, 16 or 32 sectors may be used. FIG. 5 shows an example transmit sector sweep 500. The beacon transmissions 502 occur in a pseudo-randomly selected order.

Figure 6:
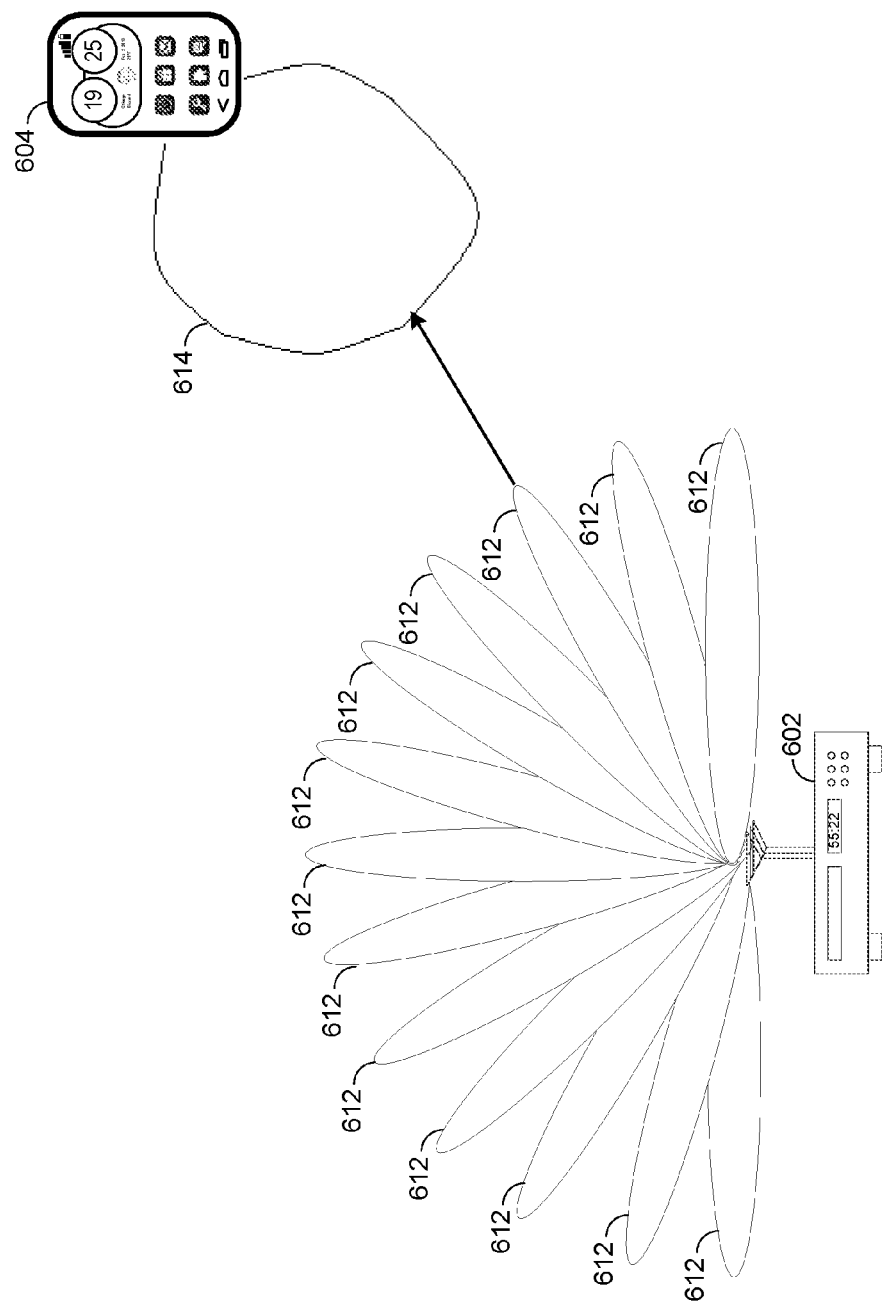
FIG. 6 shows an example CP transmitting directional beacons across multiple sectors.

Non-CP STSs, either joining the network or already associated, may operate their directional antennas in an omnidirectional or quasi-omnidirectional mode during reception of directional beacons. The initiator and/or CP transmitting the directional beacons may report the direction associated with the beacon within the content of the beacon. The responder receiving the beacon may be able to determine the direction of the beacon from the report. FIG. 6 shows an example CP 602 transmitting directional beacons 612 across multiple sectors. The STA 604 may receive one or more of the beacons while operating its antenna in a quasi-omnidirectional receive pattern 614. For example, the STA 604 may operate a DMG antenna in a mode with a wide beamwidth, i.e. a mode with large solid angle coverage.

The airtime used in transmission of a beacon may increase with the beacon payload size. If the number of STSs in a network increases, the number of IEs in the beacon frame may increase, and the airtime used may increase. The beacons may be transmitted at the control PHY. The low throughput of the control PHY may be associated with large airtime increases for increases in beacon payload content. CP beacon transmission may recur at the beacon interval. The time used by BTIs may be a large portion of the total airtime. This may increase the power consumed by the CP while transmitting beacons. Additionally or alternatively, the time used by the BTIs may reduce the time available for data transmission. For example, the time in the beacon interval reserved for the SP, CBAP, or other data access period may be shortened to allow for the increased time usage by the BTI.

Figure 7:
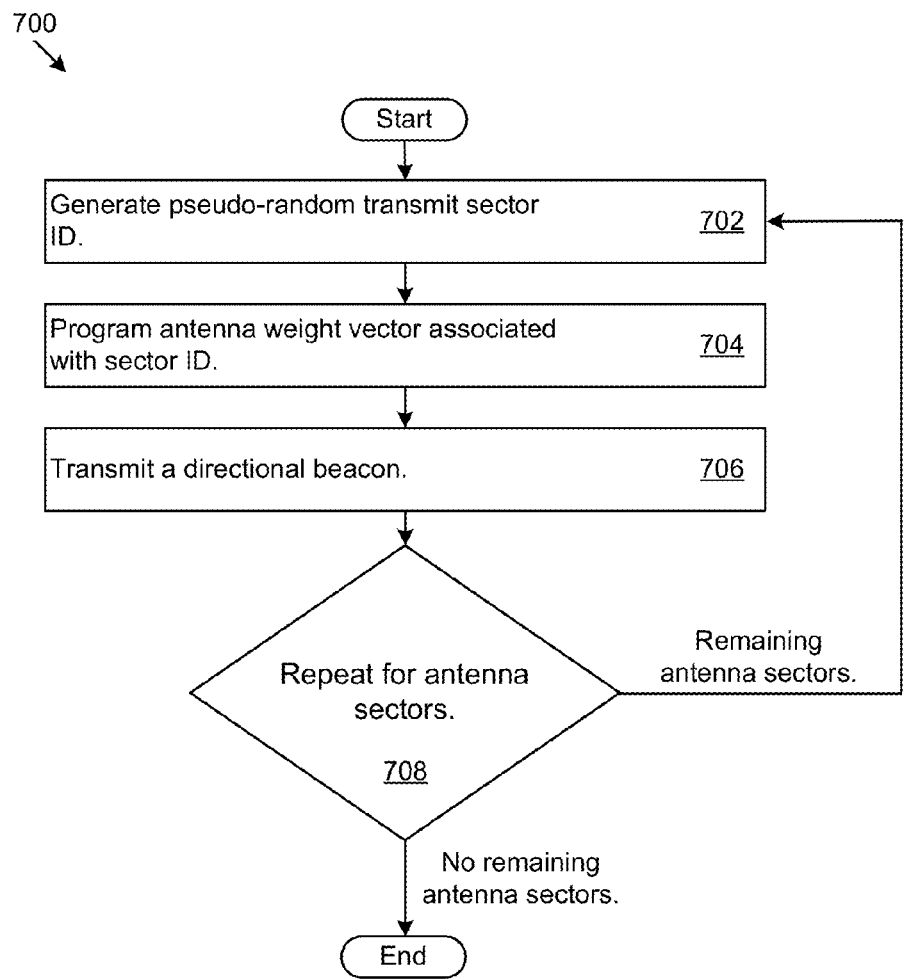
FIG. 7 shows example logic for sector determination during the beacon transmission interval (BTI).

FIG. 7 shows example logic 700 for sector determination during the BT. The CP may generate a pseudo-random transmit sector ID (702). The CP may program its AWV for the sector associated with the sector ID (704). The CP may then transmit a directional beacon in that sector (706). The CP may repeat sector ID generation 702, AWV programming 704, transmission 706 for the antenna sectors (708). The CP may repeat, at the beacon interval, transmission of the directional beacon frames in the pseudo randomly selected sectors.

Figure 8:
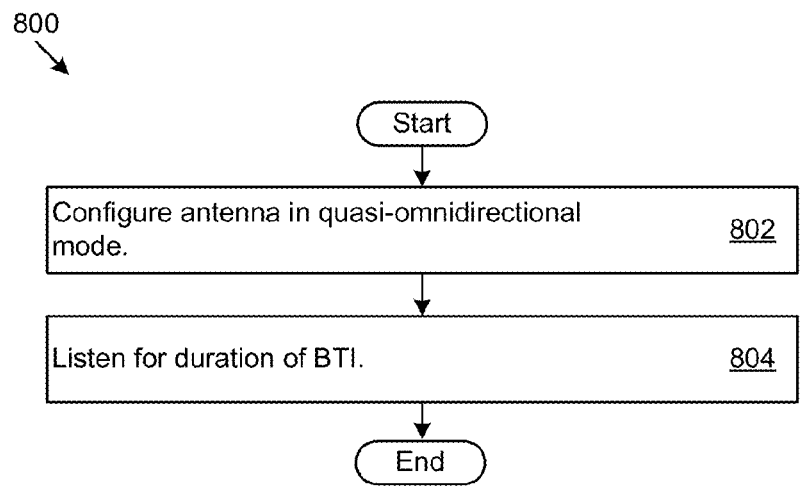
FIG. 8 shows example logic for non-CP STA reception of beacons during the BTI.

FIG. 8 shows example logic 800 for non-CP STA reception of beacons during the BTI. During the BTI, the non-CP STAs, may configure their antennas in quasi-omnidirectional mode and receive the directional beacons (802). The non-CP STAs may listen for the duration of the BTI to avoid missing a pseudo-randomly ordered beacon (804). The non-CP STAs may turn on their receiver and power their antennas for the duration of the BTI. The non-CP STAs may repeat quasi-omnidirectional mode configuration 802 and listening 804 with the beacon interval. Powering the receiver and antennas for the duration of the BTI may be associated with increased power consumption.

In some cases, the CP may optimize the beacon transmission time, which lead to power savings and increased available bandwidth for payload data transmission.

In some implementations, the STAs may reduce the duration in which they turn on their receiver and maintain their quasi-omnidirectional antenna in a powered mode. This may lead to power savings.

In some implementations, the CP may rotate through antenna sector IDs in N beacon transmissions, where N is the number of antenna sectors. This rotation may provide good spatial coverage and low latency. Unassociated STAs may receive beacons while in previously unused sectors and join the network.

In some cases, BF may be initiated between two devices, e.g. a STA and a CP, before any data communication occurs. BF may include TXSS and a BRP. TXSS may enable the BF STAs to discover each other and to determine initial transmitter AWV settings. A STA receiving a TXSS from another STA may reply to the TXSS with a selected sector for the receiving STA, e.g. the sector with the highest signal-to-noise ratio (SNR), or a sector with a high SNR near other sectors with high SNRs. This may lead to robustness during mobility The BRP may occur after the TXSS for the BF STAs. During the BRP the BF STAs may reconfigure their directional antennas from a quasi-omnidirectional mode to a determined AWV. Once directional determinations are made, the BF STAs may refine their determined transmit and receive AWV to optimize their respective SNRs.

In some implementations, the CP may send the parameters of the random Sector ID pattern to enable the STAs to predict the pseudo random beacon rotation of the CP. The CP may transmit Antenna Sector ID pattern (TAID) IE to non-CP STAs during management frame exchanges, e.g. during the BTI, A-BFT, and/or ATI.

The inclusion of IEs such as, extended schedule IEs, awake window IEs, DMG STA capability IEs, wake up schedule IEs, and/or other IEs may increase the size of the BTI. Such IEs may not be used by unassociated STAs. In some cases, information such as the TSFs, SLSs, beacon interval controls, and/or DMG parameters may be used by STAs attempting to join the network. It may be advantageous to include IEs used by STAs attempting to join the network in beacon transmissions to sectors with associated STAs and sectors without associated STAs. For associated-station IEs not used by STAs attempting to join the network, i.e. unassociated STAs, it may be advantageous to transmit these associated-station IEs to sectors with associated STAs and forgo transmission to sectors without associated STAs.

In an example implementation, a CP may have a directional antenna with 16 sectors. In the example there are no associated STAs in the network, and the CP transmits a beacon length of 70 bytes. In the example, the control PHY rate is about 133 kbytes/s. This corresponds to a BTI of 528×16=8448 µs. When a single STA joins the network, the STA Capability IE may be added to the beacon content. The beacon length increases by 19 bytes, making the BTI 608× 16=9728 µs. A 19 byte increase increases the BTI by 1.28 ms. In some cases, the BTI may repeat with the beacon interval, which may have a 100 ms spacing. The access periods for data transfer in the beacon interval may be shortened by 1.28 ms to account for the increased BTI. The potential data bandwidth may be reduced by about 1.5% by adding one STA. In the example, the control PHY may be less than the maximum throughput for the network. The 1.28 ms lost to the data transfer access periods, e.g. SPs and CBAPs, may be greater than the 19×16=304 bytes added to the bandwidth of the BTI. In some implementations, the ratio of bandwidth lost to the DTI and gained by the BTI may be 7000/1. The ratio may vary with the MCS of associated with the access periods.

In some implementations, the CP may transmit beacons with contents relevant to already associated STAs in the selected transmit sectors for those STAs. In the rest of the sectors which are not selected sectors for the associated STA, the CP may transmit beacons with IEs used in joining the network. Other IEs may be omitted from the beacon.

Figure 9:
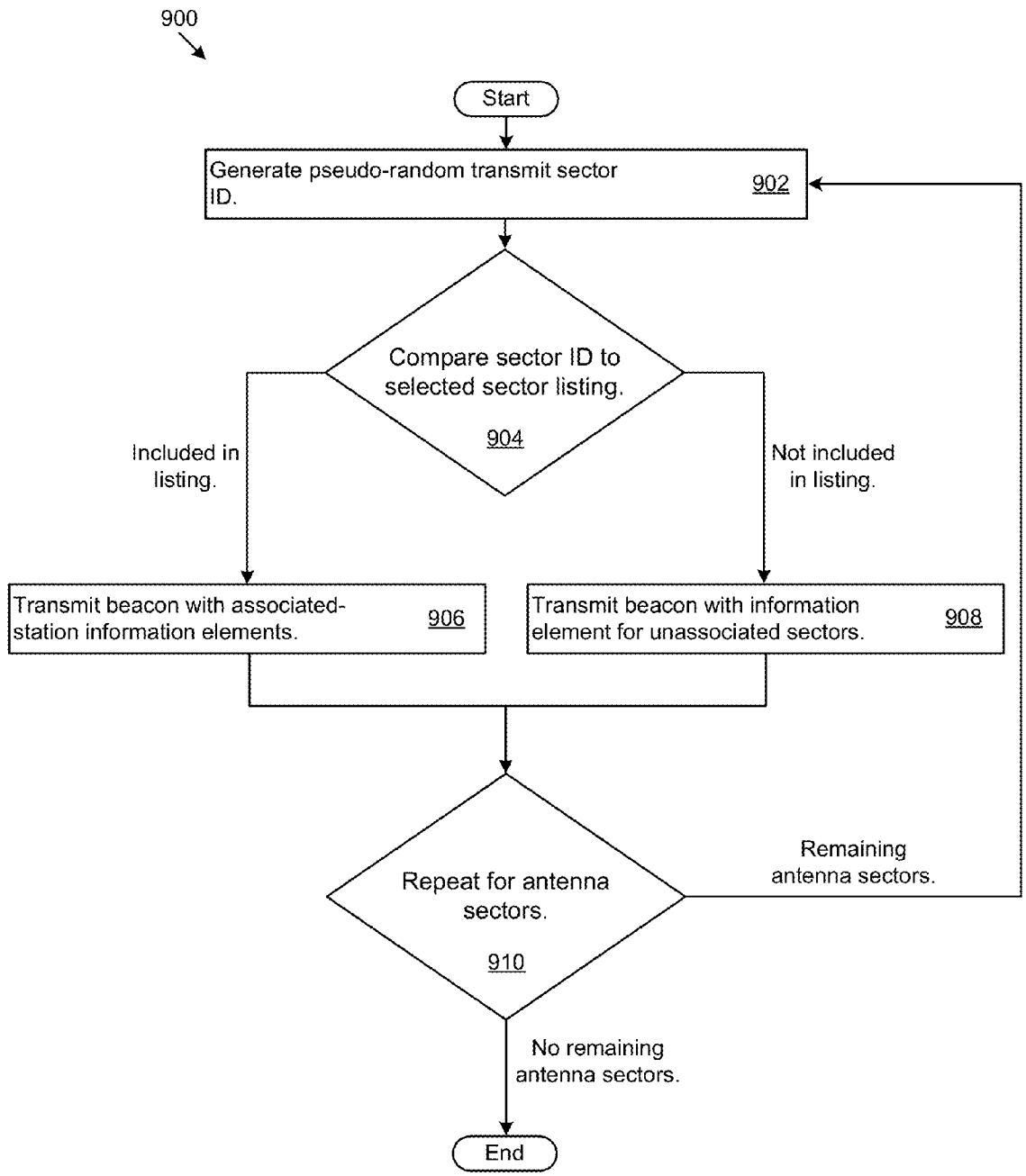
FIG. 9 shows example logic for transmission of beacons.

FIG. 9 shows example logic 900 for transmission of beacons. The CP may select a sector for transmission by generating a pseudo-random sector ID from via its sequence generator (902). The CP may compare the generated sector ID to a listing of selected sectors for associated STA (904). If the comparison indicates that the generated sector ID corresponds to a selected sector, the CP may transmit a beacon with associated-station IEs for associated STAs (906). Otherwise, the CP may transmit a beacon with IEs for unassociated STAs (908). The CP may repeat the process for the sectors of the antenna (910). The associated-station IEs may not be transmitted for the unassociated STAs. Using the logic 900, the CP may selectively transmit beacons with a smaller payload, reducing transmission time, in the directions where there are no associated STA(s). This may reduce the BTI duration in the beacon intervals.

Figure 10:
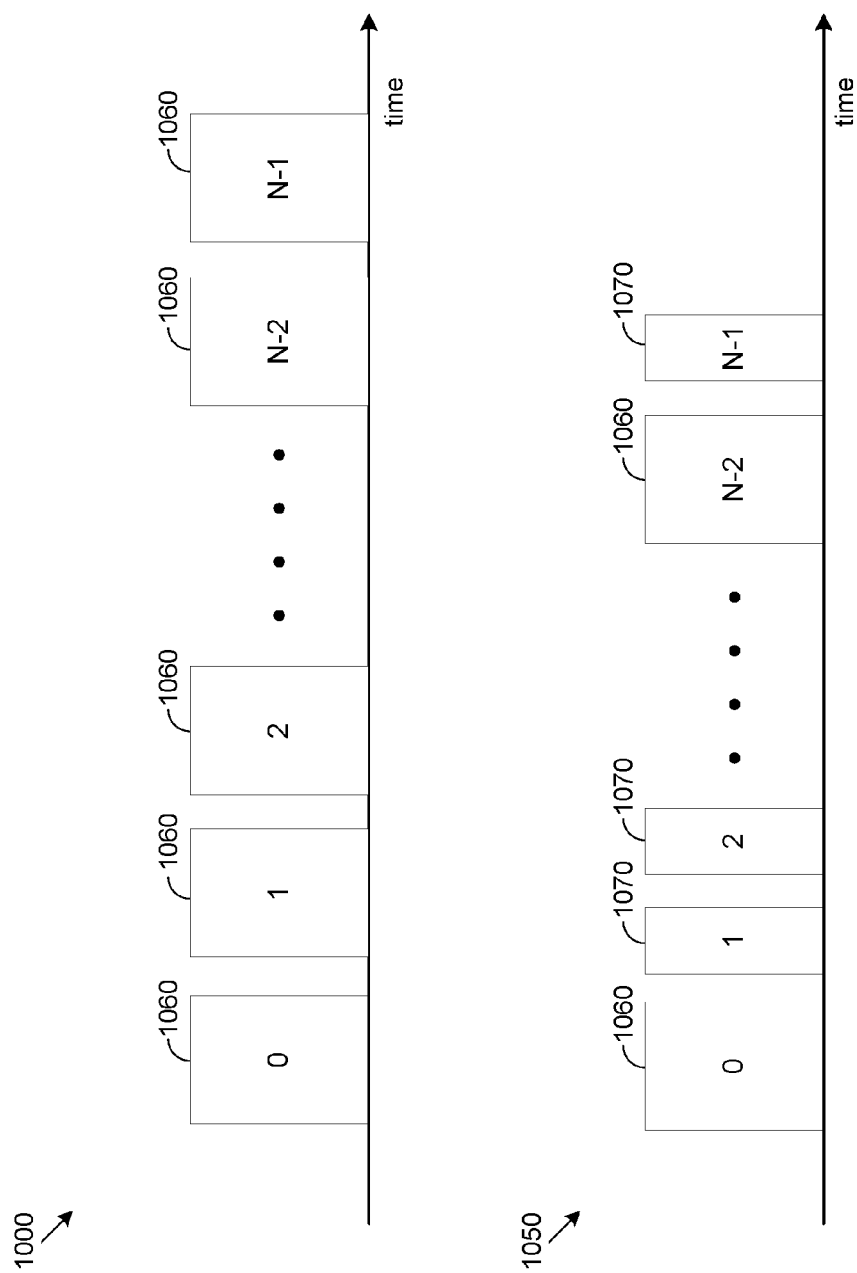
FIG. 10 shows example timing diagrams for beacon transmission.

FIG. 10 shows example timing diagrams 1000, 1050 for beacon transmission. In the example timing diagram 1000 for non-selective transmission, the beacon including the associated-station IEs 1060 is transmitted to N sectors (0, 1, 2, . . . , N-2, N-1). In the example timing diagram 1050 for selective transmission, sectors 0 and N-2 are selected sectors for associated STAs. Sectors 1, 2, and N-1 are not selected sectors. Beacons 1070 with associated-station IEs omitted are transmitted by the CP to sectors 1, 2, and N-1. Less time is used in beacon transmission in the timing diagram 1050 for selective transmission.

Figure 11:
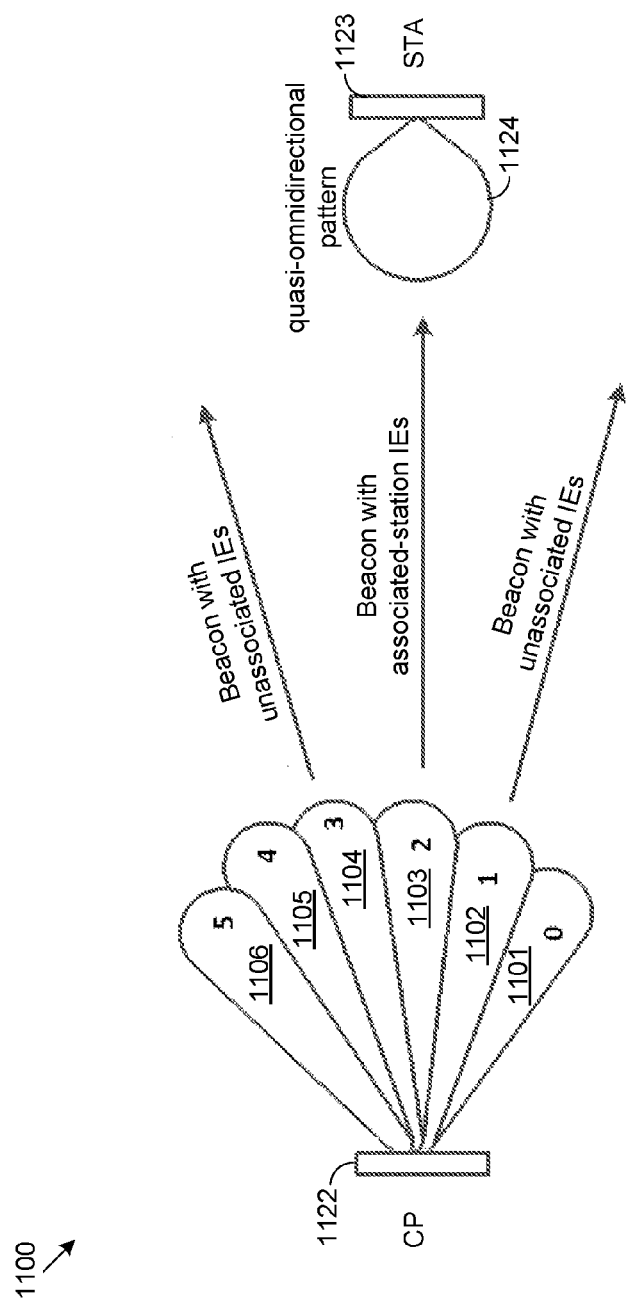
FIG. 11 shows an example beacon transmission environment.

FIG. 11 shows an example beacon transmission environment 1100. In the example environment 1100, a CP 1122 is transmitting beacons over 6 sectors 1101, 1102, 1103, 1104, 1105, 1106 (sector IDs 0 to 5). The CP has one associated STA 1123. The STA 1123 is receiving beacons with its antenna configured in a quasi-omnidirectional receive pattern 1124. CP 1122 is transmitting beacons with associated-station IEs for the associated STA 1123 in sector ID 2 1103. The remaining sectors 1101, 1102, 1104, 1105, 1106 receive beacons with the associated-station IEs omitted by the CP 1122 via the logic 900.

In some implementations, the STA may keep its receiver ON for the BTI duration to receive beacons. The STA may listen to beacons for its selected sector. The STA have its antenna powered during periods in which the CP may not be transmitting beacons to the selected sector for the STA. Since receiving period is repeated in with the beacon interval, the excess power used to listen when the CP may not be transmitting the selected sector for the STA may be cumulative over a number of repetitions. If the CP is using selective transmission logic, e.g. logic 900, the beacons transmitted to sectors which are not the selected sector for the STA may not include the associated-station IEs. The STA may listen for the beacon for its selected sector in case where it receives a beacon for another sector, e.g. another sector without the associated-station IEs.

In some cases, the STA may configure its antenna for directional reception. The STA may use a configuration determined through a previous BF training period with the CP. In some cases, this may bias reception of beacons to those transmitted to the STA's selected sector. Transmissions to the STA's selected sector may receive increased antenna gain when a directional pattern is used. Transmissions to sectors other than the selected sector may receive reduced antenna gain.

Additionally or alternatively, the STA may receive a beacon transmission and determine to which sector the beacon has been transmitted. For example, the STA may decode the sector ID from the beacon. If the beacon was not transmitted to the STA's selected sector, the STA may power down its antenna until the beacon transmission completes. The STA may then power up its antenna and receive at least a portion of the next beacon. If the beacon was transmitted to the STA's selected sector, the STA may listen to the remainder of the beacon.

In some cases, once a STA receives a beacon transmitted to its selected sector and/or a beacon with associated-station IEs transmitted to another sector the STA may power off its antenna until the end of the BTI.

In some implementations the non-CP STAs may power up their antennas when the CP transmits in their associated selected sectors. The non-CP STAs may power down their antennas when the CP transmits in other sectors.

During BTI, non-CP STAs may turn ON its receiver to receive the beacon transmitted for its selected sector, using the information provided in the TAID IE.

In some implementations, a CP may randomly or pseudo-randomly change the sequence by which it sends beacons to sectors in successive BTIs. Changes to the sequence may randomize and potentially minimize interference to/from the beacons. In some cases, the sequence of directions may be pseudo randomly chosen from a sequence of directions covering the set of directions available to the CP.

Figure 12:
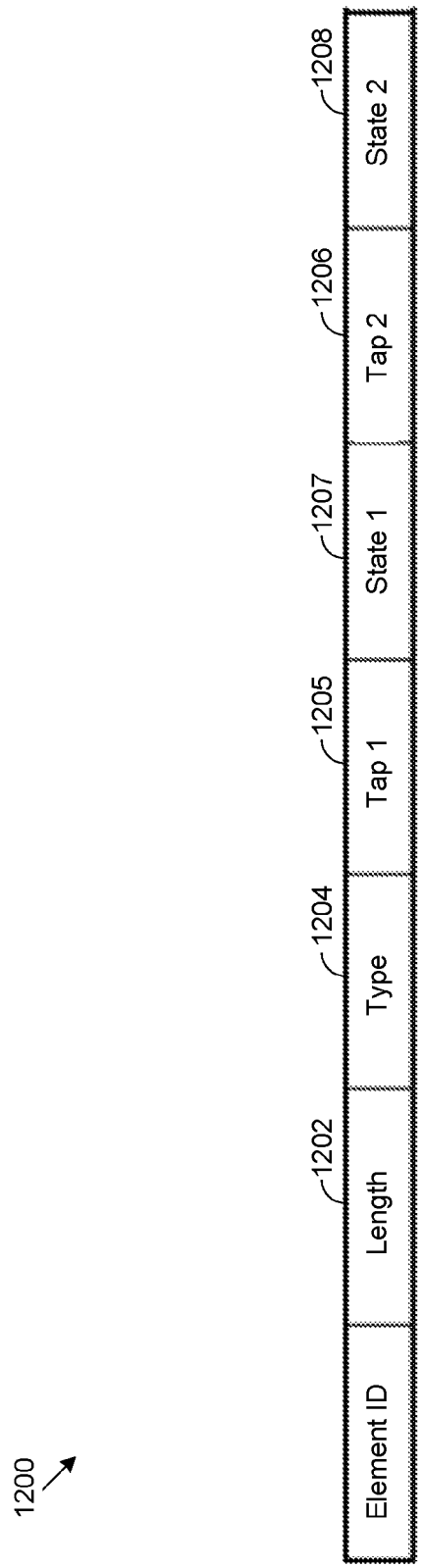
FIG. 12 shows an example transmit antenna sector identification pattern information element.

In various implementations, the CP may transmit TAID IE to non-CP STAs during transmission of a beacon or management frame, e.g. during the BTI, A-BFT, ATI, or other access periods. For example, a management frame may include an association response containing the TAID IE during a joining process for a new STA. The STA may determine the sequence of the beacon transmission by using the parameters in the TAID IE as inputs to the sector generation algorithm used by CP. FIG. 12 shows an example TAID IE 1200. The example TAID IE 1200 includes the length 1202 and type 1204 for the sequence to be generated. The example TAID IE 1200 may further include tap 1205, 1206 and/or state 1207, 1208 parameters for generation of the sequence. Additionally or alternatively, a TAID IE may include an indicator for the sequence generation algorithm used. In some cases multiple algorithms/sequence listings may be available for use by the STAs for sequence generation.

For the example TAID IE 1200, the STA may use the received TAID IE 1200 to generate the sector ID's for subsequent beacons by advancing the sequence generator initiated using tap 1 1205, and state 1 1207, and the current antenna sector ID. The STA can advance the sequence generator by shifting for each anticipated beacon transmission. According to the proposed method, the STA may advance the sequence generator and evaluate the sector ID for the upcoming beacon transmission. When the sector ID matches, the selected receive sector of the STA, the STA may then turn ON its receiver. Additionally or alternatively, the STA may turn on its receiver during a range to allow for variation in beacon transmission times. For example, a CP using logic 900 may have BTIs of varying length as STAs associate or unassociate. The CP may report the number of associated STAs in a management frame to aid in predicting this variation. The STA may configure its antenna in a directional or quasi-omnidirectional mode.

Figure 13:
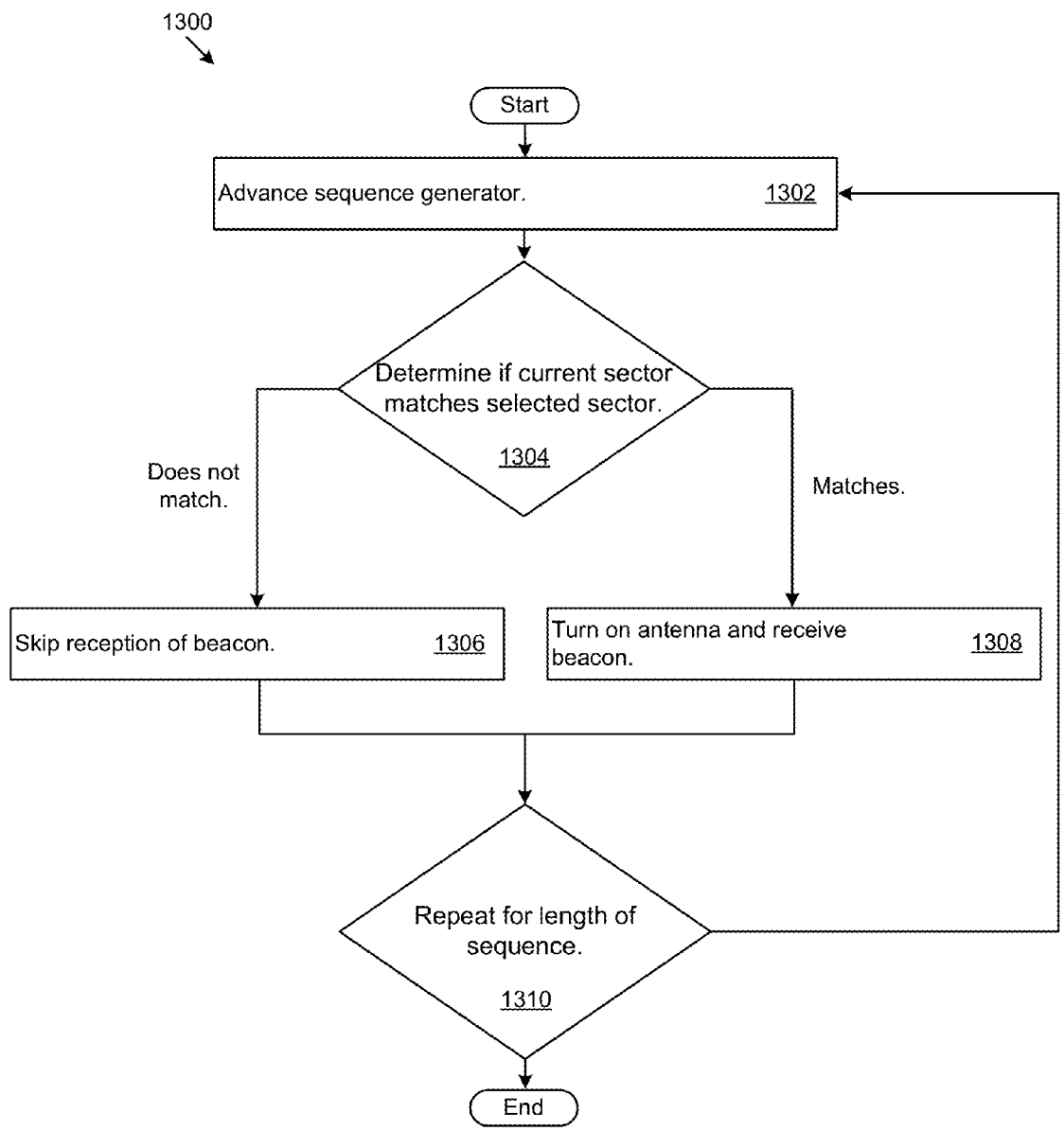
FIG. 13 shows example logic for reception of beacons.

FIG. 13 shows example logic 1300 for reception of beacons. The STA may advance the sequence generator using the TAID IE inputs (1302). The STA may determine if the current sector matches the STA's selected sector (1304). If not, the STA may skip reception of the beacon and keep its receiver and antenna in a powered down mode (1306). If the sector does match, the STA may turn on its receiver and antenna, and receive the beacon (1308). The STA may configure its antenna with receive beam pattern pointing towards the CP using the best receive sector AWV or in a quasi-omnidirectional configuration. The STA may repeat for the length of the sequence (1310).

Figure 14:
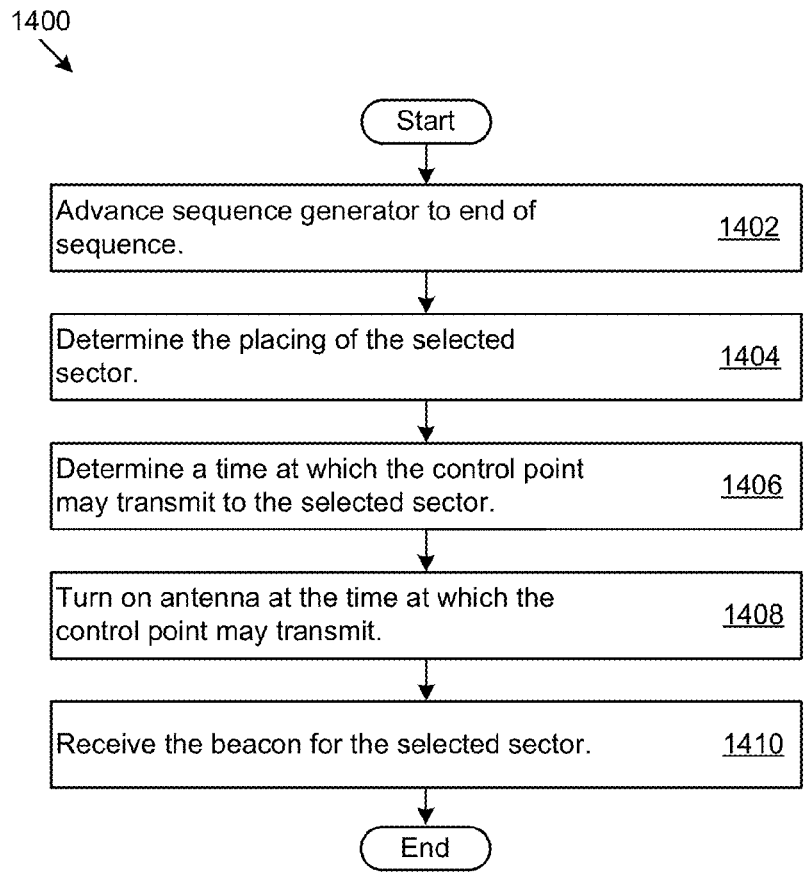
FIG. 14 shows example logic for reception of beacons.

FIG. 14 shows example logic 1400 for reception of beacons. Prior to the BTI or at the beginning of the BTI, the STA may advance the sequence generator to the end of the sequence using the TAID IE input (1402). The STA may determine the in placing of its selected sector in the sequence for the BTI (1404). The STA may determine the time at which the CP may transmit to its selected sector (1406). For example, if the CP is using logic to reduced beacon length, e.g. the logic 900, the STA may assume that beacons earlier in the sequence may not include associated-station IEs. The STA may produce an estimate of the earliest time for the STA's selected sector in the sequence. The STA may turn on its receiver at and/or after the time at which the CP may transmit. (1408). The STA may receive the beacon for its selected sector (1410).

As discussed above, a STA may, in some implementations, turn off its receiver and antenna after receiving a beacon with associated-station IEs, and turn on its receiver and antenna at the end of the BTI.

In some cases, a STA using reception logic, e.g. 1300, 1400, may turn ON its receiver for a shorter duration than the duration of the BTI. This may result in power savings. In an example scenario where CP transmits 16 beacons of 70 bytes in a beacon interval as part of the SLS, an associated STA may have its receiver on for 528×16=8448 μs. A STA using reception logic, e.g. 1300, 1400, may have its receiver on for 528 us for the same scenario. The STA can save 8448 μs–528 μs=7.92 ms worth of power for the beacon intervals, which may occur at 100 ms intervals.

In various implementations, the CP and/or associated STA(s) may be portable devices. Portable devices may be moved, and the relative position of the associated STA(s) to the CP may change. In some cases, the PCP may update the selected sector information for associated STA(s). The CP may perform this update at regular intervals or aperiodically. For example, an update may be triggered. Triggers may include signal quality reductions, indication of motion from sensors. Alternatively or additionally, the non-CP STA may request an update. Signal quality reductions may include changes in channel quality indicators, decreases in SNR, and/or other signal quality reductions. Indications of motion from sensors may include output from accelerometers, gyroscopes, GPS sensors, and/or other motion indications. Triggers may occur on a non-CP STA and the non-CP STA may initiate an update request. The updates to the selected sector may also mitigate the effects of an object that may be block or partially blocking a transmission path. In some cases, such as a blocking object, updates to the selected sector may provide transmission/reception improvements in the absence of motion and/or relative motion among the CP and associated STAs, e.g. for stationary or non-portable STAs.

Figure 15:
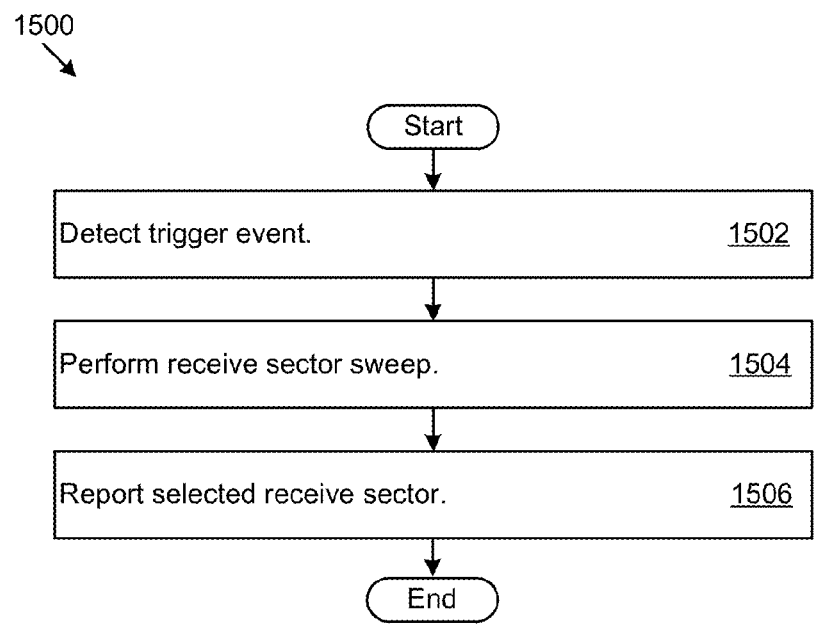
FIG. 15 shows example logic for receive sector updates.

FIG. 15 shows example logic 1500 for receive sector updates. The STA may detect a trigger event (1502). In some cases, a STA may respond to a TXSS from a CP or other initiator with a RXSS. A lost beacon or a signal quality reduction may trigger a RXSS by the STA. The STA may perform a receive sector sweep (RXSS) (1504). The STA may report its selected receive sector to the CP (1506). For example, the STA may configure its antenna for directional reception via its AWV. The STA may then report the selected AWV or a corresponding sector ID to the CP. This may be separate from the transmit AWV determined during TXSS.

The CP may update a database or listing of selected transmit and receive sectors for the STAs. Additionally or alternatively, the STAs may store selected transmit and receive sectors. Updates to these selected sectors may allow the CP and STSs to mitigate potential signal disruption from movement or blocking objects in a dynamic environment.

The STA may report its selected sector via sector sweep (SSW) feedback. The STA may perform an RXSS. After the RXSS, the STA may send a SSW acknowledgement (ACK) to the CP indicating selected sector reception.

In some implementations the CP may transmit beacons to its antenna sectors including sectors lacking associated STSs. The CP may transmit beacons to sectors lacking associated STSs to enable unassociated STSs to become aware of CP and the associated network, and join the network. In some implementations, the CP may repeat sector sweeps at the beacon interval.

Associated STSs receive beacons at the beacon interval to remain synchronized with the network. The STSs may use beacons to sync theirs TSFs with that of the CP. Additionally or alternatively, the STSs may use beacons to determine the channel access schedules. If a STA misses multiple beacons over a period the STA may lose synchronization with the CP and/or be unable to schedule data transmission.

Unassociated STSs may not be synced with the CP. Unassociated STSs may not use regular beacon transmission from the CP prior to joining the network. If the CP does not send a beacon to a receive sector for unassociated STA in a beacon interval or for a number of beacon intervals, the unassociated STA may experience delays in connecting to the network. For example, in scenario with a beacon interval of 100 ms, if an unassociated STA misses 10 beacons in a row, the STA may take 1s longer to join the network. In some cases, increasing time to join the network may not affect performance. For example, some latency in joining may be expected. Lost connections for associated devices may have a lower tolerance.

In some implementations, the CP may selectively transmit beacons to selected transmit sectors for associated STA(s) and transmit beacons less frequently to the rest of the sectors. This may reduce the average duration of the BTI.

Figure 16:
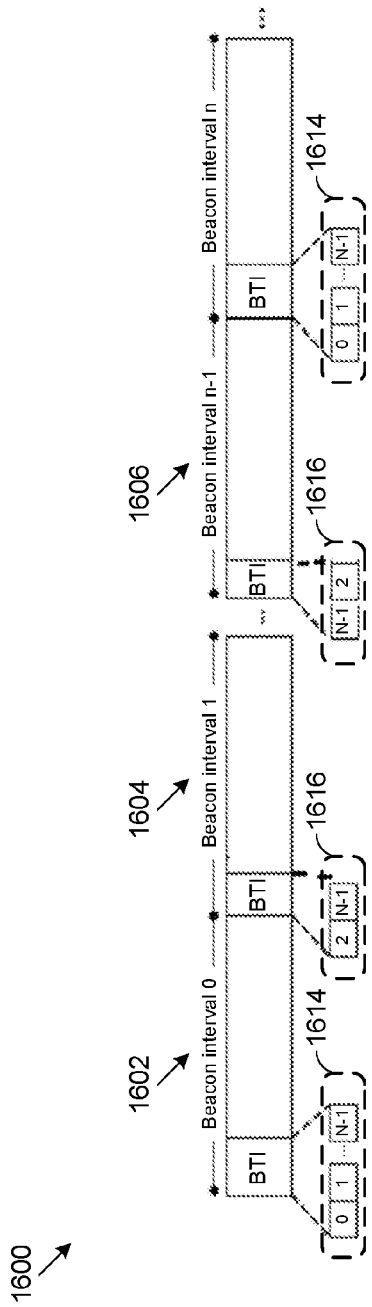
FIG. 16 shows an example timing diagram for beacon intervals.

FIG. 16 shows an example timing diagram 1600 for beacon intervals. In beacon interval 0 1602, beacons are transmitted to all N sectors 0 to N-1 1614. For beacon intervals 1 to n-1 1604, 1606, beacons are transmitted only to sectors 2 and N-1 1606, which are selected sectors for associated STAs in this example scenario.

Figure 17:
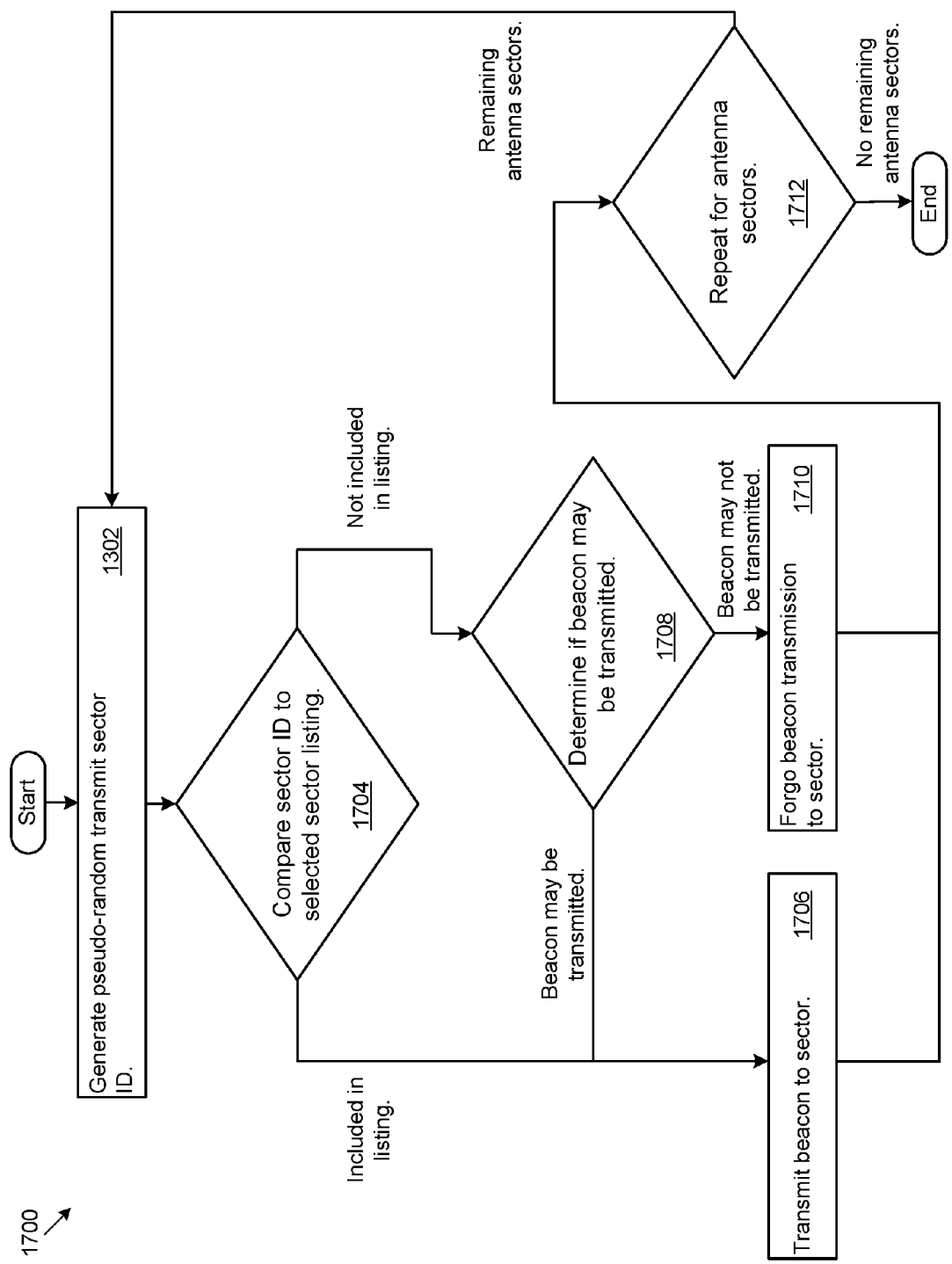
FIG. 17 shows example logic for beacon transmission.

FIG. 17 shows example logic 1700 for beacon transmission. The CP may select a sector for transmission by generating a pseudo-random sector ID from via its sequence generator (1702). The CP may compare the generated sector ID to a listing of selected sectors for associated STA (1704). If the comparison indicates that the generated sector ID corresponds to a selected sector, the CP may transmit a beacon (1706). Otherwise, the CP may determine if a beacon may be transmitted to an unassociated sector, e.g. a sector where there are no associated STAs (1708). If the CP may transmit to an unassociated sector, the CP may transmit a beacon (1706). If the CP may not transmit to an unassociated sector, the CP may forgo transmission of a beacon to the sector (1710). The process may be repeated for the antenna sectors of the CP (1712).

The determination of whether a beacon may be transmitted may be based on a transmission scheme. For example, in a given transmission scheme, the CP may transmit beacons to unassociated sectors at intervals of multiple BTIs, e.g. skip 1, 2, 3, 10 or other number of BTIs. In some implementations, for a transmission scheme, the CP may stagger transmission of beacons to unassociated sectors, e.g. transmit to a rotating fraction of the unassociated sectors in intervals of the inverse of the fraction of BTIs. For example, transmit to a rotating 20% of the unassociated sectors intervals of 5 BTIs. In such cases, the length of the BTI may remain stable. In some cases, where the number of unassociated sectors may not be divided evenly, a rotating unassociated sector may receive a beacon to maintain the stable length of the BTI. For example, an interval of 5 BTIs, e.g. 4 skipped for one sent, is used, every 100 BTIs a given unassociated sector may receive a beacon after 3 skipped BTIs. This may be analogous to a leap year system.

Additionally or alternatively, associated-station IEs may not be transmitted for the unassociated sectors using the logic 1700. Associated-station IEs may be transmitted to associated sectors. Reducing the number of transmitted beacons and/or their payload size may reduce power consumption and bandwidth committed to the BTI.

Figure 18:
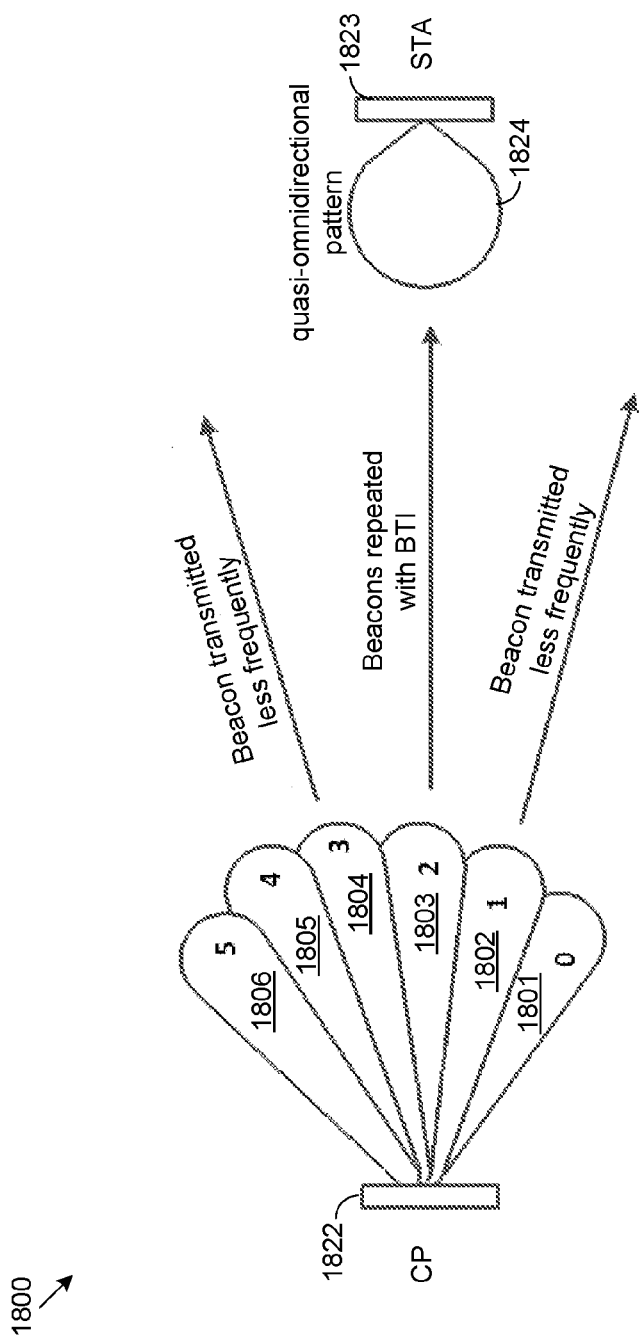
FIG. 18 shows an example beacon transmission environment.

FIG. 18 shows an example beacon transmission environment 1800. In the example environment 1800, a CP is transmitting beacons over 6 sectors 1801, 1802, 1803, 1804, 1805, 1806 (sector IDs 0 to 5). The CP 1822 has one associated STA 1823. The STA 1823 is receiving beacons with its antenna configured in a quasi-omnidirectional receive pattern 1824. The CP 1822 repeats transmission of beacons with the BTI for the associated STA 1823 in sector ID 2 1803. The remaining sectors 1801, 1802, 1804, 1805, 1806 receive beacons less frequently. Additionally or alternatively, associated-station IEs may be transmitted in sector ID 2 1803, and the associated-station IEs may be withheld for transmissions to the remaining sectors 1801, 1802, 1804, 1805, 1806.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A method, comprising:
   determining a transmission antenna weight vector for transmission of a first directional beacon to a first sector;
   transmitting, from a control point configured with the antenna weight vector, the first directional beacon to the first sector;
   receiving a selected sector indicator, at the control point, from a station in the first sector;
   in response to the selected sector indicator, changing a selected sector listing in the control point; and
   responsive to the selected sector listing, determining to transmit a second directional beacon to the first sector.

2. The method of claim 1, further comprising adding an associated-station information element to the second directional beacon.

3. The method of claim 1, where receiving the selected sector indicator comprises receiving an association response message from the station.

4. The method of claim 1, where the determining to transmit the second directional beacon to the first sector comprises determining to transmit the second beacon during a beacon transmission interval (BTI).

5. The method of claim 4, further comprising determining to forgo transmission of a third directional beacon to an unassociated sector during the BTI.

6. The method of claim 5, where determining to forgo the transmission of the third directional beacon comprises determining that the unassociated sector is unassociated by comparing the unassociated sector to the selected sector listing.

7. The method of claim 1, where transmitting the first directional beacon comprises transmitting a sector identifier in the first directional beacon.

8. The method of claim 1, further comprising performing a sector sweep responsive to the first directional beacon, the sector sweep comprising transmitting sweep beacons to antenna sectors.

9. The method of claim 8, where the receiving the selected sector indicator occurs responsive to the sector sweep.

10. The method of claim 9, further comprising:
    adding an associated-station information element to the first directional beacon; and
    omitting the associated-station information element from the second directional beacon.

11. A system, comprising:
    a control point comprising:
      a directional antenna characterized by a vector; and
      control circuitry comprising a data path to the directional antenna, the control configured to:
        input, to the vector, a vector value for a transmission sector;
        transmit a first beacon to the transmission sector;
        when a station association with the control point occurs responsive to the first beacon, transmit a second beacon to the transmission sector; and
        when the station association does not occur, forgo transmission of the second beacon to the transmission sector; and
    a station disposed in the transmission sector, the station comprising;
      a station antenna; and
      station circuitry, in communication with the station antenna, the station circuitry configured to:
        receive the first beacon from the control point;
        responsive to the first beacon, perform the station association with the control point; and
        receive the second beacon.

12. The system of claim 11, where the second beacon comprises an associated-station information element.

13. The system of claim 12, where the first beacon lacks the associated-station information element.

14. The system of claim 12, where the control circuitry is further configured to transmit the second beacon during a beacon transmission interval (BTI).

15. The system of claim 14, where the control circuitry is further configured to omit transmission of a third beacon to an unassociated sector during the BTI.

16. The system of claim 14, where the station further comprises a storage device, in data communication with the station circuitry, the storage device comprising a transmit antenna sector identification pattern (TAID) information element, the TAID information element configured to identify a beacon transmission sequence for the BTI.

17. The system of claim 16, where the station circuitry is further configured to:
    based on the beacon transmission sequence for the BTI, predict a duration of the second beacon within the BTI; and
    power off the station antenna outside of the duration.

18. A device, comprising:
    a directional antenna comprising a phased array, the phased array characterized by an antenna weight vector;
    a data storage apparatus comprising:
      an associated-station information element; and
      a selected sector listing; and
    transmission circuitry comprising:
      a data path to the data storage apparatus;
      a transceiver path to the directional antenna; and
      the transmission circuitry configured to:
        identify a sector for transmission of a beacon;
        determine a value for the antenna weight vector for the sector;
        send, via the transceiver path, the value for the antenna weight vector to the phased array;
        using the data path, perform a comparison of the sector with the selected sector listing;
        responsive to the comparison, add the associated-station information element to the beacon; and
        transmit, via the directional antenna, the beacon with the associated-station information element.

19. The device of claim 18, where the associated-station information element comprises a schedule for a data transmission interval access period.

20. The device of claim 18, where the transmission circuitry is further configured to identify a second sector for which the transmission circuitry forgoes subsequent transmission of a different beacon.

* * * * *

UNITED STATES PATENT AND TRADEMARK OFFICE
CERTIFICATE OF CORRECTION

PATENT NO. : 9,258,046 B2
APPLICATION NO. : 14/070860
DATED : February 9, 2016
INVENTOR(S) : Rajesh Kumar Sinha It is certified that error appears in the above-identified patent and that said Letters Patent is hereby corrected as shown below:

<u>In the Claims</u>

In column 13, claim 1, line 7, after "A method," replace "comprising;" with --comprising:--.

In column 13, claim 11, line 54, after "the control" insert --circuitry--.

In column 14, claim 18, line 32, after "A device," replace "comprising;" with --comprising:--.

Signed and Sealed this
Tenth Day of May, 2016

Michelle K. Lee
*Director of the United States Patent and Trademark Office*